United States Patent [19]
Birdwell et al.

[11] Patent Number: 6,032,197
[45] Date of Patent: Feb. 29, 2000

[54] DATA PACKET HEADER COMPRESSION FOR UNIDIRECTIONAL TRANSMISSION

[75] Inventors: Kenneth J. Birdwell; Ruston Panabaker, both of Bellevue; Brian Moran, Issaquah; David Feinleib, Redmond, all of Wash.

[73] Assignee: Microsoft Corporation, Redmond, Wash.

[21] Appl. No.: 08/937,476

[22] Filed: Sep. 25, 1997

[51] Int. Cl.[7] .............................. G06F 13/00; G06F 12/06
[52] U.S. Cl. ..................... 709/247; 709/216; 709/217; 709/246
[58] Field of Search .................................... 709/246, 247, 709/218, 231, 216, 217, 219, 223, 232; 370/477; 707/10

[56] References Cited

U.S. PATENT DOCUMENTS

| | | | |
|---|---|---|---|
| 4,864,572 | 9/1989 | Rechen et al. ............................ | 714/701 |
| 5,049,881 | 9/1991 | Gibson et al. ............................. | 341/95 |
| 5,293,379 | 3/1994 | Carr ........................................ | 370/474 |
| 5,455,684 | 10/1995 | Fujinami et al. ......................... | 386/111 |
| 5,497,404 | 3/1996 | Grover et al. ......................... | 348/845.1 |
| 5,835,730 | 11/1998 | Grossman et al. ....................... | 709/247 |
| 5,938,736 | 8/1999 | Muller et al. ............................ | 709/243 |

OTHER PUBLICATIONS

Jacobson V., "Compressing TCP/IP Headers for Low–Speed Serial Links", Feb. 1990.

*Primary Examiner*—Zarni Maung
*Assistant Examiner*—Jason D. Cardone
*Attorney, Agent, or Firm*—Lee & Hayes, PLLC

[57] ABSTRACT

A broadcast transmission system transmits data packets from a server to a client over a unidirectional broadcast network. The system transmits both full-length data packets, which have uncompressed headers, and reduced-length data packets, which have compressed headers derived from associated uncompressed headers. The server compresses the data packets by compressing the packet header. Compressed packet headers contain fewer header fields than their associated uncompressed headers. The server transmits a series of intermixed full-length and reduced-length packets to the client. As the packets are received, the client determines whether the packets are full-length or reduced-length. If the packet is full-length, the client stores the uncompressed header in a header table. If the packet is reduced-length, the client rebuilds the compressed header from its corresponding uncompressed headers in the header table.

42 Claims, 5 Drawing Sheets

DATA PACKET HEADER COMPRESSION FOR UNIDIRECTIONAL TRANSMISSION

TECHNICAL FIELD

This invention relates to a broadcast transmission system in which data packets are sent over a broadcast medium to multiple clients. More particularly, this invention relates to a system and method for compressing headers in the data packets and delivering the compressed packets over the broadcast medium.

BACKGROUND OF THE INVENTION

Conventional computer networks are bi-directional, allowing data communication in both directions between servers and clients. Transmitting data over these bi-directional data networks has been a mainstay of computer technology for many years and the communication protocols are well established. Under conventional communication protocols, it is common for the client to initiate connection with the server and to request desired data from the server. As part of the request, the client sends information pertaining to how the data should be sent. For example, the client might include a client address, TCP port number, and so forth.

Digital data, whether transmitted over a wire-based distribution network (e.g., local area network, wide area network, cable, etc.) or a wireless distribution network (e.g., satellite, RF, paging, etc.), is typically packetized and sent over the network in individual packets. Some protocols call for fixed size packets, while other protocols utilize variable size packets. To improve transmission efficiency and to keep pace with the exploding demand for digital information, there is a constant design objective to pump increasingly more data through the same bandwidth pipeline over the network.

One way to achieve this objective is through packet compression. Packets are compressed at the server, transmitted in their compressed state over the network, and decompressed at the client. Apart from compressing whole packets, another solution is partial packet compression in which portions of the packet, such as a header or a data payload, are compressed. One technique for compressing packet headers is discussed in an article by V. Jacobson, entitled "Compressing TCP/IP Headers for Low-Speed Serial Links," and found at the web site http://ds.internic.net/rfc/rfc1144.txt. The Jacobson technique provides an elaborate and complex compression scheme that reduces a 40-byte TCP/IP (Transmission Control Protocol/Internet Protocol) packet header to a three-byte compressed header. The compressed header has an encoded change to the packet ID, a TCP checksum, a connection number, and a change mask. The hardware and/or software used to implement the Jacobson technique must perform sophisticated computations that compress the 40-byte header to the three-byte compressed header, and then subsequently decompress the compressed header to reproduce the uncompressed header.

Apart from the classic bi-directional data networks, there is an increasing interest in the use of broadcast or multicast networks to deliver computer data and other content to clients. These types of distribution networks are unidirectional. Data flows from the server to the clients, but no return communication is possible over the same communication path. As a result, a unidirectional broadcast network cannot support the common protocols used for two-way communication over a bi-directional network, such as client-driven connections and data requests, because the clients are unable to communicate over the broadcast communication link to the server.

Like the bi-directional networks, there is benefit in sending compressed data packets over unidirectional broadcast networks. This invention is directed to a packet header compression technique that improves upon the Jacobson compression scheme, and that is specifically tailored for unidirectional broadcasts.

SUMMARY OF THE INVENTION

This invention concerns a broadcast transmission system for transmitting data packets from a server to a client over a unidirectional broadcast network. The system facilitates transmission of both full-length data packets, which have uncompressed headers, and reduced-length data packets, which have compressed headers derived from associated uncompressed headers.

In general, the server compresses the data packets by compressing the packet header. Compressed packet headers contain fewer header fields than the uncompressed headers. The server transmits a series of intermixed full-length and reduced-length packets over the broadcast medium to the clients. When a full-length packet is received, the client stores the uncompressed header in a header table. When a reduced-length packet is received, the client rebuilds the compressed header from the associated uncompressed header in the table from which the compressed header was originally derived. The uncompressed header is then appended to its data payload to effectively decompress the reduced-length data packet.

According to one implementation, the server has a packet header compressor to compress an uncompressed header into a compressed header. The uncompressed header has multiple fields. As an example, a UDP/IP (User Datagram Protocol/Internet Protocol) packet header has several well-defined IP fields—such as a version field, a header length field, a type of service field, a total length field, a packet identification field, a flag field, a fragment field, a time to live field, a protocol field, a header checksum field, a source IP address field, and a destination IP address field—and several well-defined UDP fields—such as a source port number field, a destination port number field, a UDP length field, and a UDP checksum field. Some of these fields do not change from packet to packet, rather only a subset of the fields changes.

The packet header compressor forms a compressed header from the fields of an associated uncompressed header. The compressed header contains one or more fields, which are subject to change from packet-to-packet, but not all of the fields in a normal uncompressed header. The fields that are common to both the compressed and uncompressed headers are otherwise identical. Compression is achieved by removing the non-changing header fields from the compressed header. For instance, in the case of compressing a UDP/IP header, the packet header compressor might form a compressed header having only the packet identification field, the flag field, and the fragment field, which change from packet to packet, while omitting the other IP and UDP fields.

The server also has a packet encoder to construct full-length and reduced-length data packets by appending data payloads and compression key blocks to the uncompressed and compressed headers. A full-length data packet includes a compression key block, an uncompressed header, and a data payload. A reduced-length data packet includes a compression key block, a compressed header, and a data payload. The compression key block has a compression bit value that identifies the packet as either a full-length data packet or a reduced-length data packet. The compression key block also contains a header index value that indexes to a memory location in a header table at a recipient where the uncompressed packet header is or will be stored. A transmitter resident at tle server transmits the full-length and reduced-length data packets over a unidirectional distribution medium to the clients.

Each client has a packet decoder to extract the compression key blocks from the data packets. If the compression bit value indicates that the packet is full-length, the packet decoder stores the uncompressed header in the memory location of the header table referenced by the corresponding header index value. On the other hand, if the compression bit value indicates that the packet is reduced-length, the client utilizes a packet header decompressor to reconstruct the uncompressed header. The packet header decompressor accesses the header table at a memory location indexed by the header index value contained in the reduced-length data packet. The memory location holds the uncompressed header from which the compressed header was derived. The packet header decompressor then reconstructs missing fields in the compressed header from the full set of fields in the associated uncompressed header. The full-length packets and decompressed packets are then passed onto the next layer in the protocol stack for further processing.

DETAILED DESCRIPTION OF THE PREFERRED EMBODIMENT

Figure 1:
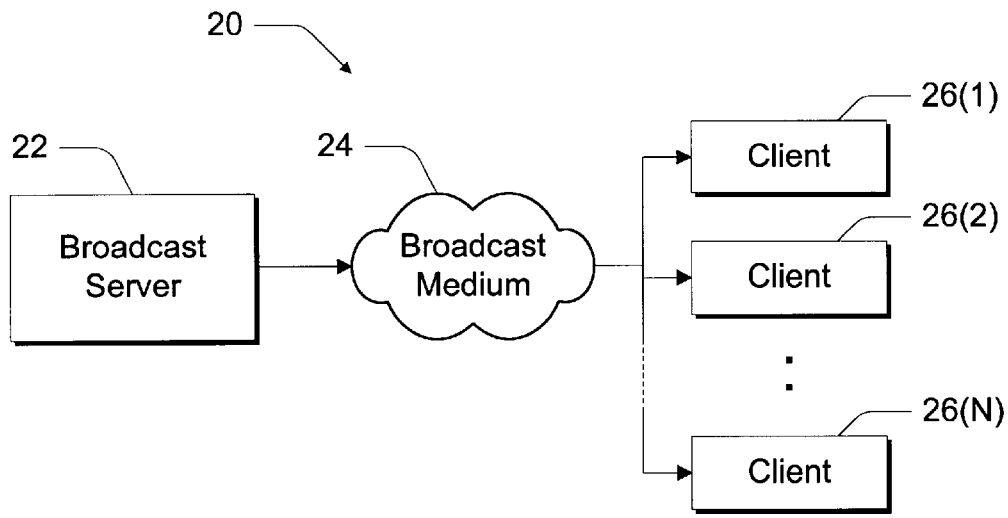
FIG. 1 is a diagrammatic illustration of a broadcast transmission system for broadcasting data packets from a server to multiple clients over a unidirectional broadcast medium.

FIG. 1 shows a broadcast transmission system 20. Content is delivered in the form of data packets a broadcast server 22 over a broadcast medium 24 to multiple clients 26(1), 26(2), . . . , 26(N). Examples of transmittable content include computer data, audio, video, animation, bit maps or other graphics, applications or other executable code, text, hypermedia, or other multimedia types.

The broadcast medium 24 may comprise the entire distribution network between the server and client, or it may be a single link in a larger distribution network. Generally, the broadcast medium 24 is unidirectional in the sense that packets are delivered from the server 22 to the clients 26(1)–26(N) without requiring return communication from the clients. The broadcast medium 24 can be characterized as a shared, highly asymmetrical, network resource with a limited, if not completely absent, low speed return path that does not need to be active to receive broadcast transmissions.

The broadcast medium 24 can be implemented in a variety of ways. For instance, the broadcast network might be implemented as a wireless network configured for one-way transmission (i.e., satellite, radio, microwave, etc.). The broadcast network might also be a network that supports two-way communication (i.e., Internet, LAN (local area network), and WAN (wide area network)), but can be used for unidirectional multicasting from the broadcast server 22 to the clients 26(1)–26(N).

In general, the server 22 and the client 26 both have knowledge of the protocol and the block format of each packet. The server 22 compresses certain ones of the data packets by compressing their packet headers. Compressed packet headers contain fewer header fields than the uncompressed headers. The server 22 transmits both full-length data packet headers (which contain uncompressed headers) and reduced-length data packets (which contain compressed headers derived from the uncompressed headers) over the broadcast medium 24 to the clients. To realize sufficient benefit, a higher percentage of compressed, reduced-length packets are transmitted in comparison to full-length data packets. The client stores the uncompressed headers of the full-length data packets in a header table. The client then rebuilds compressed headers from the uncompressed headers in the table to decompress the reduced-length data packets.

Figure 2:
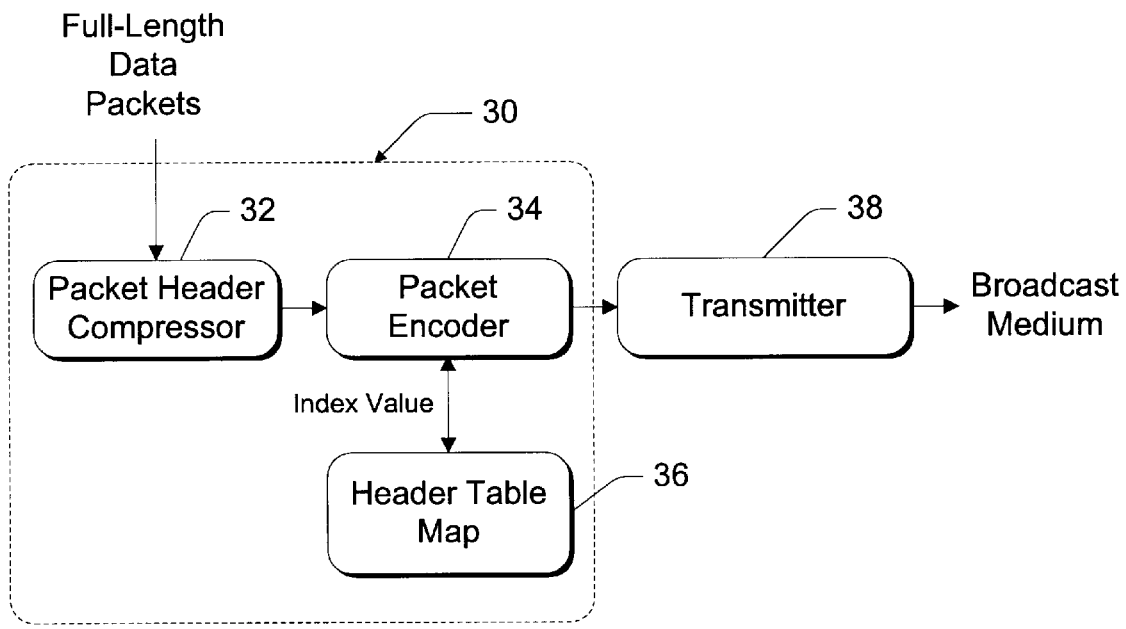
FIG. 2 is a functional block diagram of a packet compressor located at the server to prepare data packets prior to transmission over the broadcast medium.

FIG. 2 shows a packet compressor 30 implemented at the broadcast server 22. It includes a packet header compressor 32, a packet encoder 34, and a header table map 36. The packet compressor 30 can be implemented in hardware, software, or a combination of both. One example implementation is to incorporate the packet compressor into server software, such as Windows® NT from Microsoft Corporation, which executes on a server computer.

The packet header compressor 32 receives an incoming stream of full-length data packets that comprise a data payload and an uncompressed packet header. The data packets may be constructed according to one or multiple protocol formats. For discussion purposes, aspects of this invention are described in the context of a UDP/IP (User Datagram Protocol/Internet Protocol) format. However, this invention can accommodate other well-known formats as well, including TCP/IP, IPX/SPX, and NetBEUI. Moreover, one aspect of this invention concerns a header compression scheme that is capable of supporting multiple different formats individually or intermixed.

Figure 3:
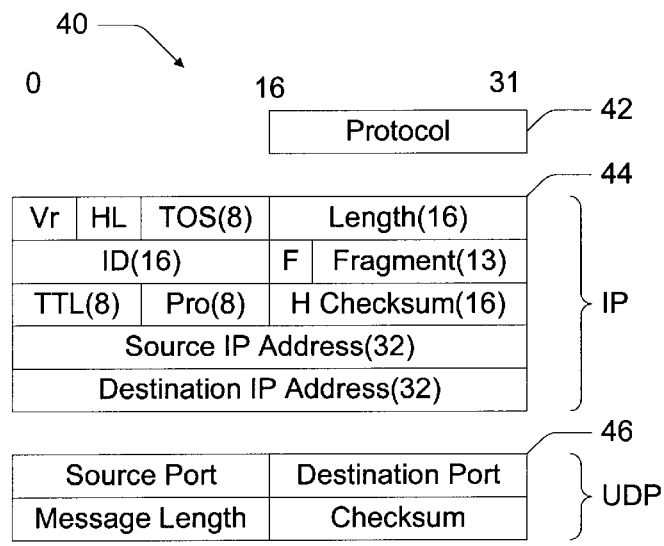
FIG. 3 is a diagrammatic illustration of a header constructed according to UDP/IP (User Datagram Protocol/Internet Protocol) format.

FIG. 3 shows an uncompressed header 40 constructed according to the UDP/IP format. A 16-bit protocol block 42 identifies the protocol format for the header 40. In this case, the protocol block 42 contains the protocol number "0x0800", which specifies the UDP/IP protocol. The header 40 also has a 160-bit IP portion 44, and a 64-bit UDP portion 46. The IP portion 44 consists of multiple IP fields: a 4-bit version field, a 4-bit header length field, an 8-bit type of service field, a 16-bit total length field, a 16-bit packet identification or sequence field, a 3-bit flag field, a 13-bit fragment field, an 8-bit time to live field, an 8-bit protocol field, a 16-bit header checksum field, a 32-bit source IP address field, and a 32-bit destination IP address field. The UDP portion 46 consists of multiple UDP fields: a 16-bit source port number field, a 16-bit destination port number field, a 16-bit UDP length field, and a 16-bit UDP checksum field.

The fields in the IP and UDP portions are well known, and are not discussed in detail. A detailed discussion of the UDP and IP formats is provided in a number of textbooks, such as Richard Stevens, *TCP/IP Illustrated, Volume* 1, Addison-Wesley Publishing Company, ©1994 and Douglas E. Comer, *TCP/IP, Volume* 1, *Principles, Protocols, and Architecture*, Third Edition, Prentice Hall, ©1995.

Some of the fields in the packet headers do not change from packet to packet, rather only a subset of the fields changes. In the case of the UDP/IP format, only the 16-bit packet identification field, the 3-bit flag field, and the 13-bit fragment offset field change from packet to packet. Other fields might change every few or more packets, but not every packet. In addition, some fields are redundant or non-essential and can be omitted or recomputed on the client side.

With reference again to FIG. 2, the packet header compressor 32 forms a compressed header from the fields of an associated uncompressed header. Preferably, the packet header compressor 32 forms a compressed header having those fields that are subject to change from packet-to-packet, but not all of the fields in a normal uncompressed header. In the UDP/IP example, the packet header compressor 32 forms a 32-bit compressed header containing only the 16-bit packet identification field, the 3-bit flag field, and the 13-bit fragment offset field. The other IP and UDP fields are omitted.

The fields that are common to both the compressed and uncompressed headers are identical. That is, the fields themselves are not compressed. The 16-bit packet identification field, for example, is the same in both uncompressed headers and compressed headers. Compression is achieved by removing the non-changing header fields from the compressed header. In the UDP/IP case, the packet header is compressed from 224 bits to 32 bits. By keeping the fields the same, the header compression technique simplifies packet header compression and decompression at the server and client.

In FIG. 2, the packet encoder 34 receives the data payloads and packet headers (compressed or uncompressed) from the packet header compressor 32 and forms full-length and reduced-length data packets that are ready for transmission over the broadcast medium. Full-length data packets have a data payload and an uncompressed header, whereas reduced-length data packets have a data payload and a compressed header. Reduced-length data packets may also be referred to in this disclosure as "compressed" data packets.

Figure 4:
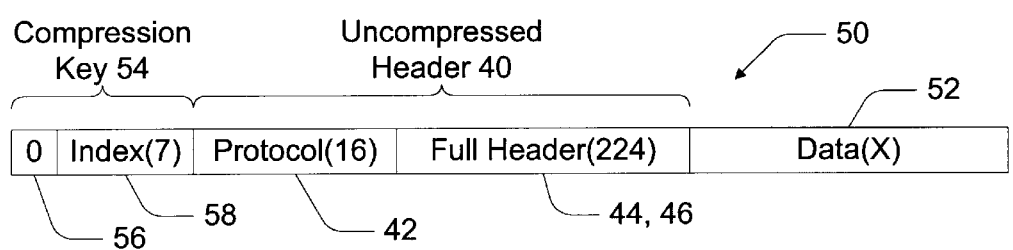
FIG. 4 is a diagrammatic illustration of a data structure for a full-length data packet type.

FIG. 4 shows a full-length data packet 50 that is constructed according to the UDP/IP format. The full-length data packet 50 includes an X-bit data payload 52 and an uncompressed UDP/IP header 40. The uncompressed header 40 consists of the 224-bit IP and UDP headers 44 and 46, and the 16-bit protocol block 42 (FIG. 3).

Figure 5:
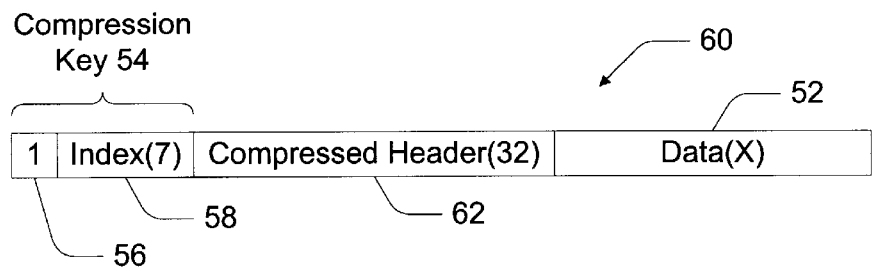
FIG. 5 is a diagrammatic illustration of a data structure for a reduced-length data packet type.

FIG. 5 shows a compressed or reduced-length data packet 60 that is derived from the full-length data packet 50. The reduced-length data packet 60 has the X-bit payload 52 and a compressed header 62. In the UDP/IP case, the compressed header 62 is a 32-bit header comprising the 16-bit packet identification field, the 3-bit flag field, and the 13-bit fragment offset field.

The packet encoder 34 (FIG. 2) appends a compression key 54 to each packet, regardless of whether the packet is full-length or reduced length. As shown in FIGS. 4 and 5, the compression key 54 has a compression bit value 56 and a header index value 58. The compression bit value 56 identifies the packet as either a full-length data packet or a reduced-length data packet. In this example, the compression bit value is a one-bit compression flag that is a first binary value, such as a "0", when the data packet is full-length and a second binary value, such as a "1", when the data packet is reduced-length.

The header index value 58 references a memory location at the destination client. More particularly, the header index value 58 is used to reference an entry in a header table at the destination client. If the header index value 58 belongs to the full-length data packet 50, the header index value designates an entry in the header table for storing the uncompressed header 40. On the other hand, if the header index value 58 belongs to the reduced-length data packet 60, the header index value designates an entry in the header table that stores (or will store) the associated uncompressed header 40 from which the compressed header 62 is derived.

With continuing reference to FIG. 2, the packet encoder 34 derives one or more reduced-length data packets from a full-length data packet. A full-length data packet and a reduced-length data packet are said to be "associated", "corresponding" or other similar language if the compressed header in the reduced-length data packet is derived from the uncompressed header in the full-length data packet. Likewise, an uncompressed header and a compressed header are said to be "associated", "corresponding" or other similar language if the compressed header contains a subset of the fields found in the uncompressed header.

The packet compressor 30 includes a header table map 36, which tracks or mirrors the entries in the header table at the client. When the packet encoder 34 assigns a header index value to a full-length data packet, the packet encoder 34 requests from the header table map 36 an index value to a new location in the header table for storing the uncompressed header. When the packet encoder assigns a header index value to a reduced-length data packet, the packet encoder 34 receives from the header table map 36 an index value to a location in the header table that stores the associated uncompressed header. Through the use of the header table map, the server is in complete control of when an uncompressed header is sent, and where it is stored at the client.

It is noted that the packet encoder 34 may append other headers and trailers to the data packets. For instance the packet encoder might add a trailer containing a CRC (cyclic redundancy check) value. The packet encoder prepares the packets for transmission over the broadcast medium.

The packet compressor 30 outputs both the full-length and reduced-length data packets to a transmitter 38 for transmission over the broadcast medium. The transmitter 38 may be implemented in many different ways, depending upon the network implementation. For instance, the transmitter 38 may be a satellite uplink, an RF transmitter, a microwave transmitter, a modem, a network card, and so forth.

Figure 6:
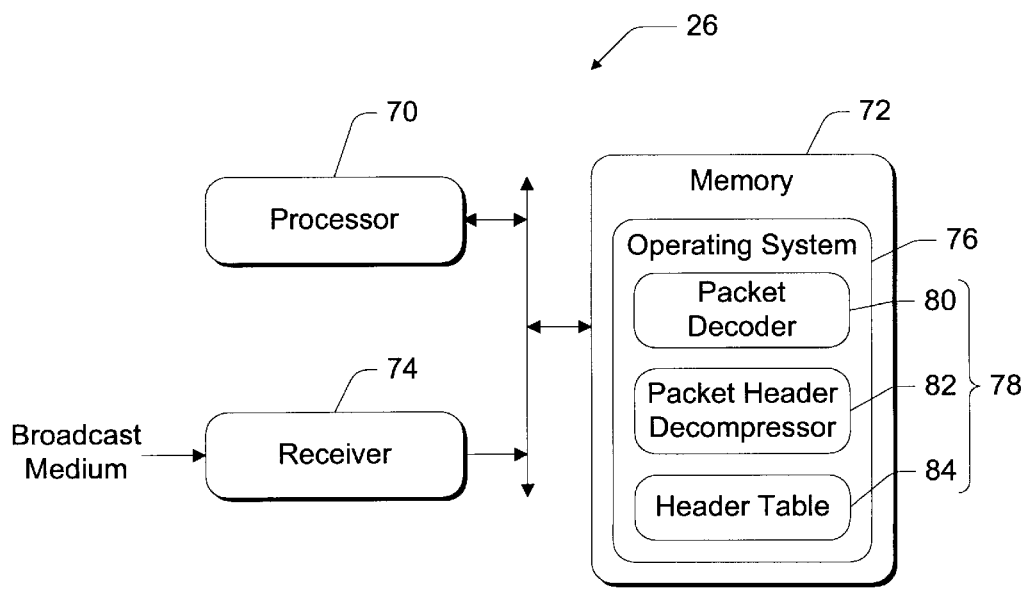
FIG. 6 is a block diagram of the client.

FIG. 6 shows an exemplary configuration of a client 26 implemented as a broadcast-enabled computer. It includes a central processing unit having a processor 70 (e.g., x86 or Pentium®-family microprocessor from Intel Corporation) and memory 72. The memory 72 generally includes volatile memory (e.g., RAM) and non-volatile program memory (e.g., ROM, disk drive, floppy disk drive, CD-ROM, etc.). The client 26 typically has one or more input devices (e.g., keyboard, mouse, etc.) and a computer display (e.g., VGA, SVGA), which are not shown in this figure. The client 26 also includes a digital broadcast receiver 74 (e.g., satellite dish receiver, RF receiver, microwave receiver, NTSC-VBI receiver, digital cable TV decoder, modem, network card, etc.) to receive the full-length and reduced-length data packets from the distribution medium.

The client 26 runs an operating system 76 that supports multiple applications. The operating system 76 is preferably a multitasking operating system that allows simultaneous execution of multiple applications. One preferred operating system is a Windows® brand operating system sold by Microsoft Corporation, such as Windows® 95 or Windows® NT or other derivative versions of Windows®. It is noted, however, that other operating systems may be employed.

In the FIG. 6 implementation, the operating system 76 incorporates a packet decompressor 78 to decompress data packets received by the receiver 74 from the broadcast medium. The packet decompressor 78 has a packet decoder 80, a packet header decompressor 82, and a header table 84. Although the packet decompressor 78 is shown implemented in software as part of the operating system 76, it may alternatively be implemented as a separate component in hardware and/or software.

The packet decoder 80 extracts the compression key 54 from each incoming data packet. If the compression flag 56 in the compression key 54 indicates that the packet is full-length, the packet decoder stores the appended uncompressed header 40 in the header table 84 at a memory location referenced by the header index value 58. If the compression flag 56 in the compression key 54 indicates that the packet is reduced-length, the packet decoder passes the appended compressed header 62 and header index value 58 to the packet header decompressor 82.

It is noted that the packet decoder 80 may perform other functions, such as error analysis, stripping away carrier headers that are not needed by the upper layer protocols, and the like.

The packet header decompressor 82 reconstructs an uncompressed header from the compressed header received from the packet decoder 80. The packet header decompressor 82 utilizes the header index value 58 to reference the memory location in the header table 84 that stores the associated uncompressed header. The decompressor 82 rebuilds the header by adding the missing fields in the compressed headers from the full set of fields in the associated uncompressed headers store in the table. In the UDP/IP case, the packet header decompressor 82 adds all of the fields in the IP portion 44 and UDP portion 46, excepting the packet identification field, the flag field, and the fragment/offset field from the IP portion 44 that are already present in the uncompressed header.

Figure 7:
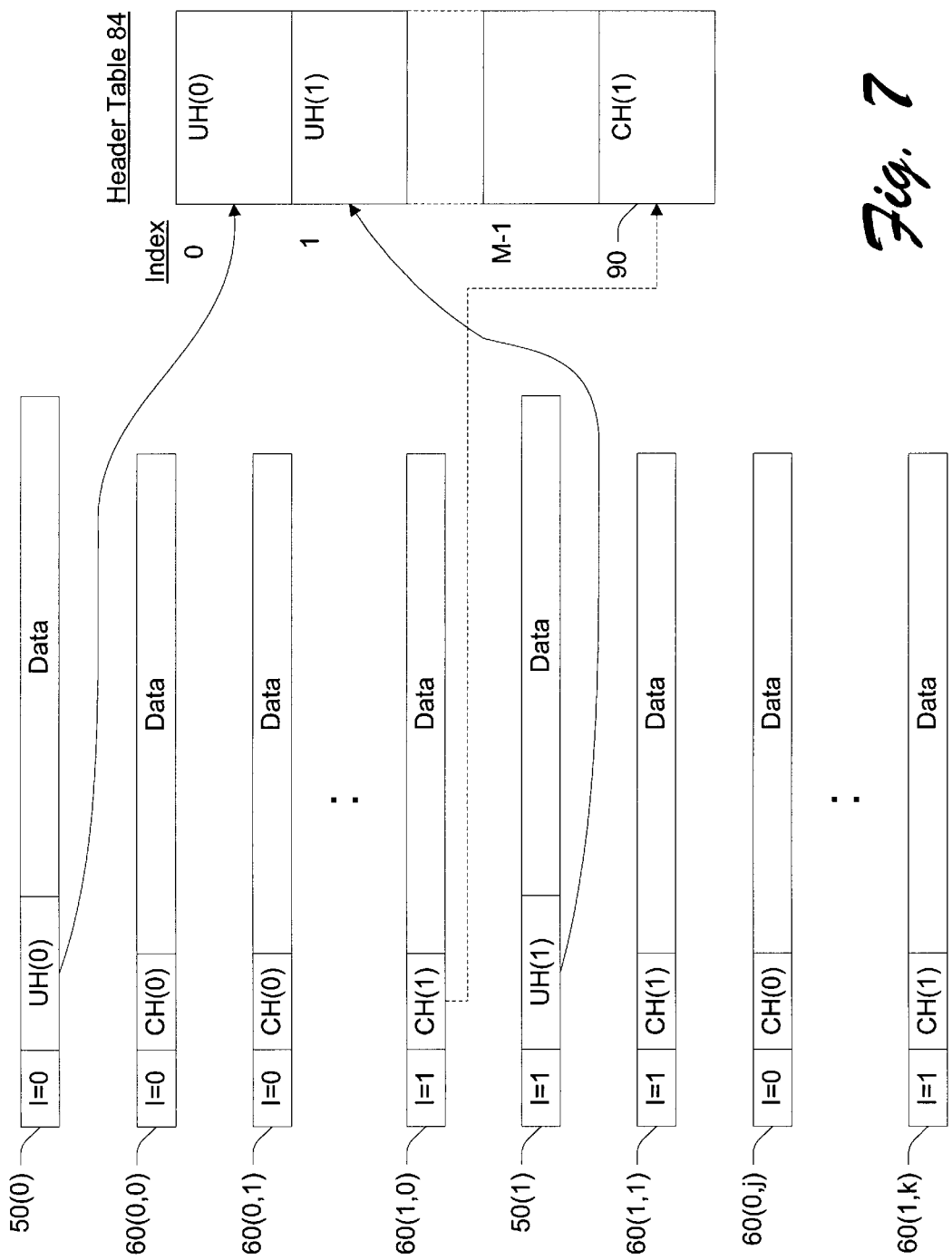
FIG. 7 is a diagrammatic illustration of a series of intermixed full-length and reduced length data packets and a header index table.

FIG. 7 illustrates the packet decompressing process implemented at the client. A series of intermixed full-length packets 50 and reduced-length packets 60 is received at the client from the broadcast medium. The first full-length packet 50(0) has an index value of "0" (i.e., the "I=0" block) which references entry 0 in the header table 84. The packet decoder 80 stores the uncompressed header UH(0) from data packet 50(0) at entry 0 in the header table 84, as indicated by the solid arrow.

The next packet in the series is a reduced-length packet 60(0,0). The notation "60(x,y)" means the $y^{th}$ reduced-size packet 60 that is derived from the $x^{th}$ full-length data packet. The reduced-length packet 60(0,0) carries an index value of "0" (i.e., The "I=0" block) because the compressed header CH(0) is associated with the uncompressed header UH(0) that is stored in table entry 0. Accordingly, the packet header decompressor uses the index value of 0 to access the header table 84 and locate the associated uncompressed header UH(0) for rebuilding the compressed header UH(0). This process is continued for the next reduced-length packet 60(0,1), and so on.

The next full-length packet 50(1) has an index value of "1" (i.e., the "I=1" block) which references entry 1 in the header table 84. The packet decoder 80 stores the uncompressed header UH(1) from data packet 50(1) at entry 1 in the header table 84. Any reduced-length data packet 60(1,y) that is derived from full-length packet 50(1) also carries a header index value of 1 to locate the associated uncompressed header UH(1).

The header table 84 has additional space 90 to temporarily cache compressed headers in the event that their associated uncompressed headers are not yet received at the client and stored in the table. If a compressed header arrives at the client before the uncompressed header from which it is derived, the compressed header is cached until the associated uncompressed header is indexed into the table. In FIG. 7, the reduced-length data packet 60(1,0) is received prior to its corresponding full-length data packet 50(1). The packet decoder 80 places the compressed header CH(1) in a compressed header cache 90. After the associated uncompressed header UH(1) is received and stored in entry 1, the packet decompressor 82 retrieves the cached compressed header CH(1) from cache 90 and rebuilds it from the uncompressed header UH(1).

The header table 84 has a finite number of entries "M". The uncompressed headers UH(0), UH(1), . . . UH(M–1) stored in the table can be configured to time out or expire after a preset duration. This ensures that only up-to-date uncompressed headers are maintained in the table. Since the server is in complete control of when an uncompressed header is sent, and where it is stored in the table, the server can send new uncompressed header entries as desired. Additionally, the table 84 can be implemented to help manage the entries. For instance, the header table 84 may manage entries according to a first-in-first-out (FIFO) protocol, so that the newest header overwrites the oldest header. However, other protocols may be used, such as one based on frequency of use whereby newly added headers overwrite the least frequently used headers.

One advantage of this compression scheme is that it is not protocol dependent. The UDP/IP format is used herein as an example, but many other formats may be used. Moreover, the compression scheme can accommodate simultaneous transmission of different protocols, so long as the client and server are both aware of the different types. In FIG. 7, for example, the first full-length data packet 50(0), and its reduced-length derivatives 60(0,y), may be encoded using one format and the second full-length data packet 50(1), and its reduced-length derivatives 60(1,y), may employ a different format.

Figure 8:
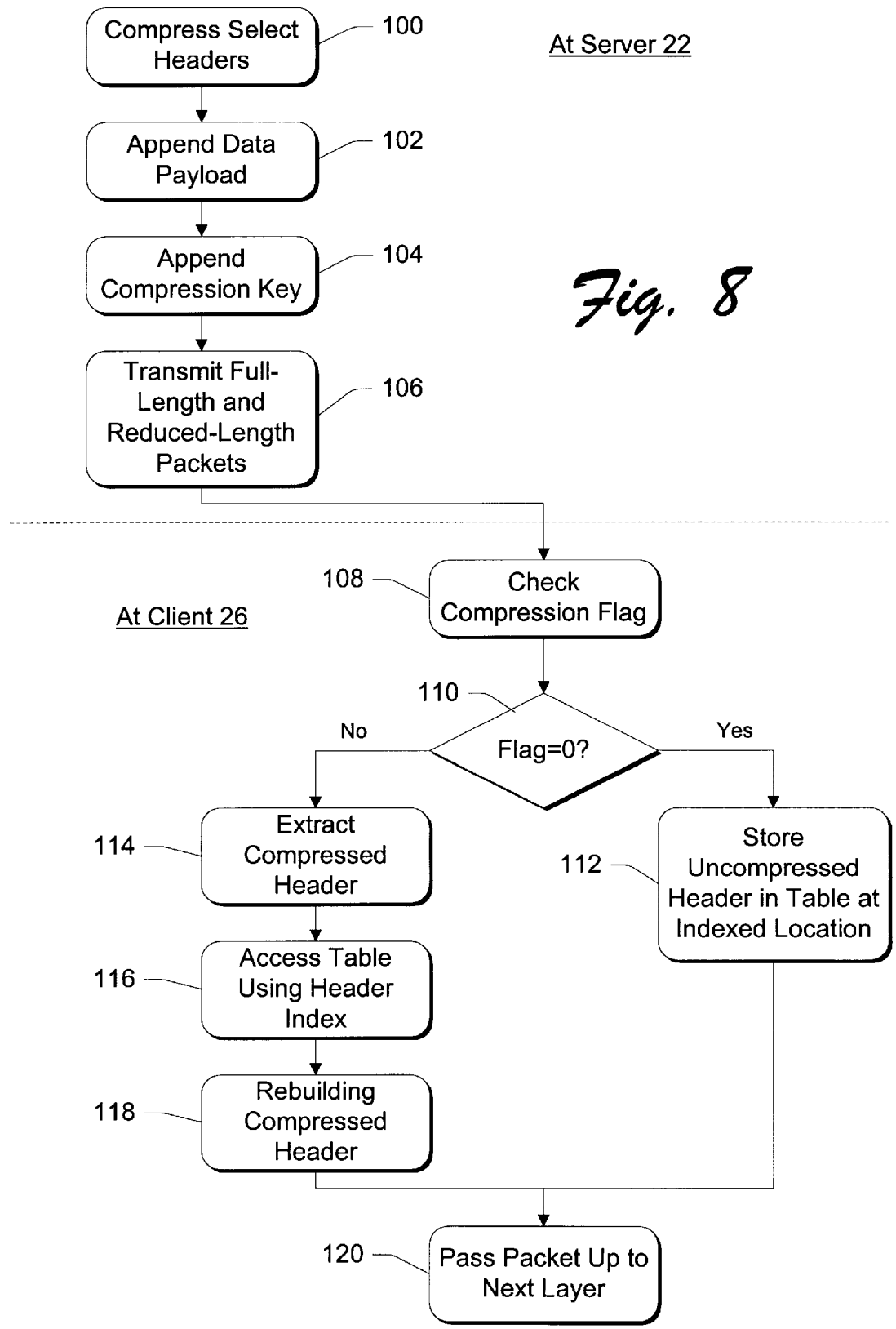
FIG. 8 is a flow diagram of a method for serving full-length and reduced-length data packets from a server to a client over a broadcast medium.

FIG. 8 shows exemplary steps in a method for serving full-length and reduced-length data packets from a server to a client over a broadcast medium. At step 100, the server 22 compresses select packet headers. The server 22 can employ many different techniques for choosing which packet headers to compress. One approach is to identify groups of packets in which only a predetermined subset of fields change and for each group, leave one uncompressed header and compress the remaining headers from the uncompressed header. Another technique is to try to compress P headers for every uncompressed header.

At steps 102 and 104, the server 22 appends the data payload and compression key to the uncompressed or compressed header to form full-length or reduced-length data packets, respectively. The server 22 transmits a series of intermixed full-length and reduced-length data packets over the broadcast medium 24 to the clients 26(1)–26(N) (step 106 in FIG. 8).

At step 108 in FIG. 8, each client 26 receives the packets and checks the compression flag in the compression key. If the flag is a binary "0" indicating that the packet is full-length (i.e., the "yes" branch from step 110), the client 26 extracts the uncompressed header and stores it in the header table 84 at an entry indexed by the header index value (step 112). Conversely, if the flag is a binary "1" indicating that the packet is reduced-length (i.e., the "no" branch from step 110), the client 26 extracts the compressed header from the data packet (step 114) and uses the header index value to access the associated uncompressed header in the header table 84 (step 116 in FIG. 8). The client 26 uses the uncompressed header to reconstruct the compressed header (step 118). As the reduced-length packets are decompressed, the client passes all packets, including the decompressed and full-length packets, up to the next protocol layer in the protocol stack (step 120 in FIG. 8).

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

We claim:

1. A method for serving full-length and reduced-length data packets from a server to a client over a unidirectional broadcast medium, each full-length data packet having a data payload and an uncompressed header with multiple fields, the method comprising the following steps:

at the server:
   compressing an uncompressed header to form an associated compressed header having a subset of one or more of the fields so that the fields that are common to the associated uncompressed and compressed headers are identical;
   forming a reduced-length data packet having the compressed header and a data payload;
   appending a compression key to each of the full-length and reduced-length data packets, the compression key specifying whether the appended data packet is full-length or reduced-length and whether the full-length and reduced-length data packets have associated uncompressed and compressed headers;
   transmitting the full-length and reduced-length data packets from the server to the client over a unidirectional broadcast medium;

at the client:
   extracting the uncompressed header from the full-length data packet;
   storing the uncompressed header;
   extracting the compressed header from the reduced-length data packet; and
   decompressing the compressed headers by adding fields from the uncompressed header stored at the client that is indicated by the compression keys as being associated to the compressed header, the added fields restoring the subset of fields contained in the compressed header to said multiple fields contained in the uncompressed header.

2. A method as recited in claim 1, wherein the appending step comprises the step of appending a two-block compression key having a first block that specifies whether the appended data packet is full-length or reduced-length and a second block containing an index to a table at the client, whereby the associated uncompressed and compressed headers are indexed to a same location in the table.

3. A method as recited in claim 2, wherein the storing step comprises the step of storing the uncompressed header in the table, and further comprising the step of subsequently removing the uncompressed header from the table to make room for new uncompressed headers.

4. A method as recited in claim 1, further comprising the step of temporarily caching the compressed header in an event that the uncompressed header associated with the cached compressed header has not yet been received at the client.

5. A method as recited in claim 1, further comprising the step of transmitting a higher percentage of the reduced-length data packets in comparison to the full-length data packets.

6. A method as recited in claim 1, further comprising the step of forming and transmitting multiple groups of full-length and reduced-length data packets, wherein each said group of data packets is formatted according to a different transmission protocol.

7. Computer-readable media located at the server and the client having computer-executable instructions for performing the steps of the method as recited in claim 1.

8. A reduced-length data packet having a compressed header embodied on a transmission medium and constructed according to the steps performed at the server in the method as recited in claim 1.

9. A method for compressing a data packet for transmission over a broadcast medium, the data packet comprising a data payload and an uncompressed packet header having multiple fields, the method comprising the following steps:

forming a compressed packet header comprising at least one, but not all, of the fields from the uncompressed packet header;
   appending the data payload to the compressed packet header; and
   appending a compression key to the compressed packet header, the compression key having a first block containing information to inform a receiver that the appended packet header is a compressed packet header and a second block containing an index to a table at the receiver that identifies the memory location of the uncompressed packet header.

10. A method as recited in claim 9, further comprising the step of transmitting as a reduced-length data packet comprising the compressed packet header, the data payload, and the compression key.

11. A reduced-length data packet embodied on a transmission medium and constructed according to the steps performed at the server in the method as recited in claim 10.

12. A compressed data packet embodied on a computer-readable medium constructed according to the steps performed at the server in the method as recited in claim 9.

13. A computer programmed to perform the steps of the method as recited in claim 9.

14. A computer-readable medium having computer-executable instructions for performing the steps of the method as recited in claim 9.

15. A method for compressing an uncompressed packet header of a UDP/IP data packet to be transmitted over a broadcast medium, the uncompressed packet header having an IP portion containing multiple IP fields and a UDP portion containing multiple UDP fields, the method comprising the following steps:

forming a compressed packet header comprising at least one, but not all, of the IP fields in the uncompressed packet header; and appending a compression key to the compressed packet header, the compression key comprising a first block containing information to inform a receiver that the appended packet header is a compressed packet header and a second block containing an index to a table at the receiver that identifies where the uncompressed packet header is or will be stored.

16. A method as recited in claim 15, wherein the IP fields include a packet identification field and a fragment field, the forming step comprises the step of forming a compressed packet header consisting of the packet identification field and the fragment field.

17. A method as recited in claim 15, wherein the IP fields include a packet identification field and a fragment field, further comprising the following steps:

forming a 32-bit compressed packet header consisting of the packet identification field and the fragment field;

appending a 7-bit index value to the compressed packet header, the index value containing an index to a table at a receiver that identifies where the uncompressed packet header is or will be stored; and appending a one-bit compression flag to the index value that is used to inform the receiver that the appended packet header is a compressed packet header.

18. A method as recited in claim 15, further comprising the step of appending a data payload to the compressed packet header.

19. A method as recited in claim 18, further comprising the step of transmitting as a reduced-length data packet comprising the compressed packet header, the data payload, and the compression key.

20. A reduced-length data packet embodied on a transmission medium and constructed according to the steps performed at the server in the method as recited in claim 19.

21. A compressed data packet embodied on a computer-readable medium constructed according to the steps performed at the server in the method as recited in claim 15.

22. A computer programmed to perform the steps of the method as recited in claim 15.

23. A computer-readable medium having computer-executable instructions for performing the steps of the method as recited in claim 15.

24. A broadcast transmission system for transmitting full-length and reduced-length data packets from a server to a client over a broadcast medium, comprising:

a packet header compressor resident at the server to compress an uncompressed header with multiple fields into an associated compressed header with at least one, but not all, of the fields from an associated uncompressed header;

a packet encoder resident at the server to form full-length and reduced-length data packets, the full-length data packets including a data payload and an uncompressed header and the reduced-length data packets including a data payload and a compressed header, the packet encoder further including with each full-length data packet a header index value, the packet encoder further including with each reduced-length data packet the header index value of the full-length data packet that contains the uncompressed header that is associated with the compressed header within the reduced-length data packet;

wherein the packet encoder appends a first bit value to the full-length data packets and a second bit value to the reduced-length data packets to differentiate the full-length and reduced-length data packets;

a transmitter at the server to transmit the full-length and reduced-length data packets over the broadcast medium;

a receiver at the client to receive the full-length and reduced-length data packets from the distribution medium; and a packet decoder at the client to extract the header index values from the full-length data packets and store the uncompressed headers of the full-length data packets in memory locations referenced by corresponding header index values; and a packet header decompressor at the client to reconstruct uncompressed headers from the compressed headers in the reduced-length data packets, the packet header decompressor utilizing the header index values from the reduced-length data packets to reference the memory locations containing the associated uncompressed headers and reconstruct missing fields in the compressed headers from the fields in the associated uncompressed headers.

25. A broadcast transmission system as recited in claim 24, wherein the packet decoder stores the uncompressed headers in a table at an entry identified by the corresponding header index values.

26. A broadcast transmission system as recited in claim 24, wherein the packet decoder stores the uncompressed headers in a table according to a first-in-first-out protocol.

27. A broadcast transmission system as recited in claim 24, wherein the packet decoder stores the uncompressed headers in a table, the stored uncompressed headers being considered expired after a predetermined time period elapses.

28. A broadcast transmission system as recited in claim 24, wherein the packet header decompressor temporarily caches a compressed header in an event that the uncompressed header associated with the cached compressed header has not yet been received at the client.

29. A broadcast transmission system as recited in claim 24, wherein the transmitter transmits a higher percentage of the reduced-length data packets in comparison to the full-length data packets.

30. A broadcast transmission system as recited in claim 24, wherein groups of the full-length and reduced-length data packets are formatted according to different transmission protocols.

31. A broadcast transmission system as recited in claim 24, wherein the data packets are formatted according to an UDP/IP protocol, the uncompressed headers have an IP portion containing multiple IP fields and a UDP portion containing multiple UDP fields and the compressed headers have at least one, but not all, of the IP fields in the associated uncompressed header.

32. A broadcast transmission system as recited in claim 31, wherein the IP fields include a packet identification field and a fragment field and the compressed headers comprises the packet identification field and the fragment field.

33. A data packet compressor for compressing a data packet for transmission over a broadcast medium, the data packet comprising a data payload and an uncompressed packet header having multiple fields, comprising:

a packet header compressor to form a compressed packet header having at least one, but not all, of the fields from the uncompressed packet header;

a packet encoder to append a header index value to the compressed packet header, the header index value identifying for a recipient the uncompressed packet header from which the compressed packet header is formed; and wherein the packet encoder appends a bit value to the header index value to indicate that the appended header is compressed;

the packet encoder further appending a data payload to the compressed packet header.

34. A data packet compressor as recited in claim 33, wherein the data packet is formatted according to an UDP/IP protocol, the uncompressed header has an IP portion containing multiple IP fields and a UDP portion containing multiple UDP fields and the compressed headers has at least one, but not all, of the IP fields in the associated uncompressed header.

35. A data packet compressor as recited in claim 34, wherein the IP fields include a packet identification field and a fragment field and the compressed header comprises the packet identification field and the fragment field.

36. A data packet compressor as recited in claim 34, wherein the IP fields include a packet identification field and a fragment field, further comprising:

the packet header compressor forms a 32-bit compressed packet header consisting of the packet identification field and the fragment field; and the packet encoder appends a 7-bit index value to the compressed packet header and a one-bit compression flag to inform the recipient that the appended packet header is compressed.

37. A software program embodied on a computer-readable medium having code which implements the data packet compressor as recited in claim 33.

38. A data packet decompressor for decompressing a compressed data packet received from a broadcast medium, the compressed data packet comprising a data payload, a compressed packet header with one or more fields, a header index value, and a bit value to the header index value to indicate that the appended header is compressed, comprising:

a packet decoder to extract the compressed header from the compressed data packet;

a packet header decompressor to access a memory location referenced by the header index value, the memory location holding a full uncompressed packet header having multiple fields that include the fields in the compressed data packet and other fields missing from the compressed data packet; and the packet header decompressor rebuilding a decompressed packet header from the compressed packet header by adding the missing fields from the memory location to the fields in the compressed data packet.

39. An operating system embodied on a computer-readable medium having code which implements the data packet decompressor as recited in claim 38.

40. A network packet structure embodied on a computer-readable medium, comprising:

a full-length data packet type comprising:
a data payload;
an uncompressed header appended to the data payload, the uncompressed header having multiple fields;
a header index value to reference a memory location at a destination to hold the uncompressed header;
a first bit value to identify the packet as the full-length data packet type; and, a reduced-length data packet type derived from the full-length data packet type comprising:
a data payload;
a compressed header appended to the data payload, the compressed header having at least one, but not all, of the fields found in the uncompressed header;
the header index value; and
a second bit value to identify the packet as the reduced-length data packet type.

41. A network packet structure as recited in claim 40, wherein:

the uncompressed header is a UDP/IP header having an IP portion containing multiple IP fields and a UDP portion containing multiple UDP fields; and the compressed header has at least one, but not all, of the IP fields in the associated uncompressed header.

42. A network packet structure as recited in claim 40, wherein:

the uncompressed header is a UDP/IP header that includes a packet identification field and a fragment field; and the compressed header consists of the packet identification field and the fragment field.

* * * * *